United States Patent [19]

Davis et al.

[11] Patent Number: 4,769,642

[45] Date of Patent: Sep. 6, 1988

[54] PAGING RECEIVER WITH LPC SPEECH SYNTHESIZER

[75] Inventors: Walter L. Davis, Coral Springs, Fla.; Wendell Little, Carrollton, Tex.

[73] Assignee: Motorola, Inc., Schaumburg, Ill.

[21] Appl. No.: 125,794

[22] Filed: Nov. 27, 1987

Related U.S. Application Data

[63] Continuation of Ser. No. 815,477, Dec. 31, 1985, abandoned.

[51] Int. Cl.⁴ .......................... H04B 7/00; H04Q 7/02
[52] U.S. Cl. ............................... 340/825.440; 379/56; 379/88
[58] Field of Search ..................... 340/825.44, 825.48, 340/311.1; 381/51, 86; 379/56, 88, 57; 370/84

[56] References Cited

U.S. PATENT DOCUMENTS

| | | | |
|---|---|---|---|
| 4,330,689 | 5/1982 | Kang et al. | 370/84 |
| 4,389,537 | 6/1983 | Tsunoda et al. | 381/86 |
| 4,479,124 | 10/1984 | Rodriguez et al. | 340/825.44 |
| 4,480,253 | 10/1984 | Anderson | 340/825.44 |
| 4,518,961 | 5/1985 | Davis et al. | 340/825.44 |
| 4,701,943 | 10/1987 | Davis et al. | 340/825.44 |

OTHER PUBLICATIONS

Tremain, Thomas E., "The Government Standard Linear Predictive Coding Algorithm: LPC-10", Speech Technology, Apr. 1982, pp. 40–49.

Primary Examiner—Donald J. Yusko
Attorney, Agent, or Firm—Joseph T. Downey; Anthony J. Sarli, Jr.; Donald B. Southard

[57] ABSTRACT

A paging receiver with an LPC speech synthesizer is described. The paging receiver of the present invention includes a controller and decoder, and a microprocessor controlled speech synthesizer both coupled to a dual port memory. Digitally encoded voice messages are stored in a dual port memory which includes a scratchpad area for storing control words and address pointers which indicate the attributes and location of stored digitally encoded voice messages. Messages are reconstructed by reading the control words and address pointers and processing the information stored in memory with a speech synthesizer. The structure is adapted to store and process LPC encoded signals and it permits a message to be stored while another is being reproduced. In addition, information contained in the control words permits old or read messages to be discarded if a new message must be stored.

20 Claims, 13 Drawing Sheets

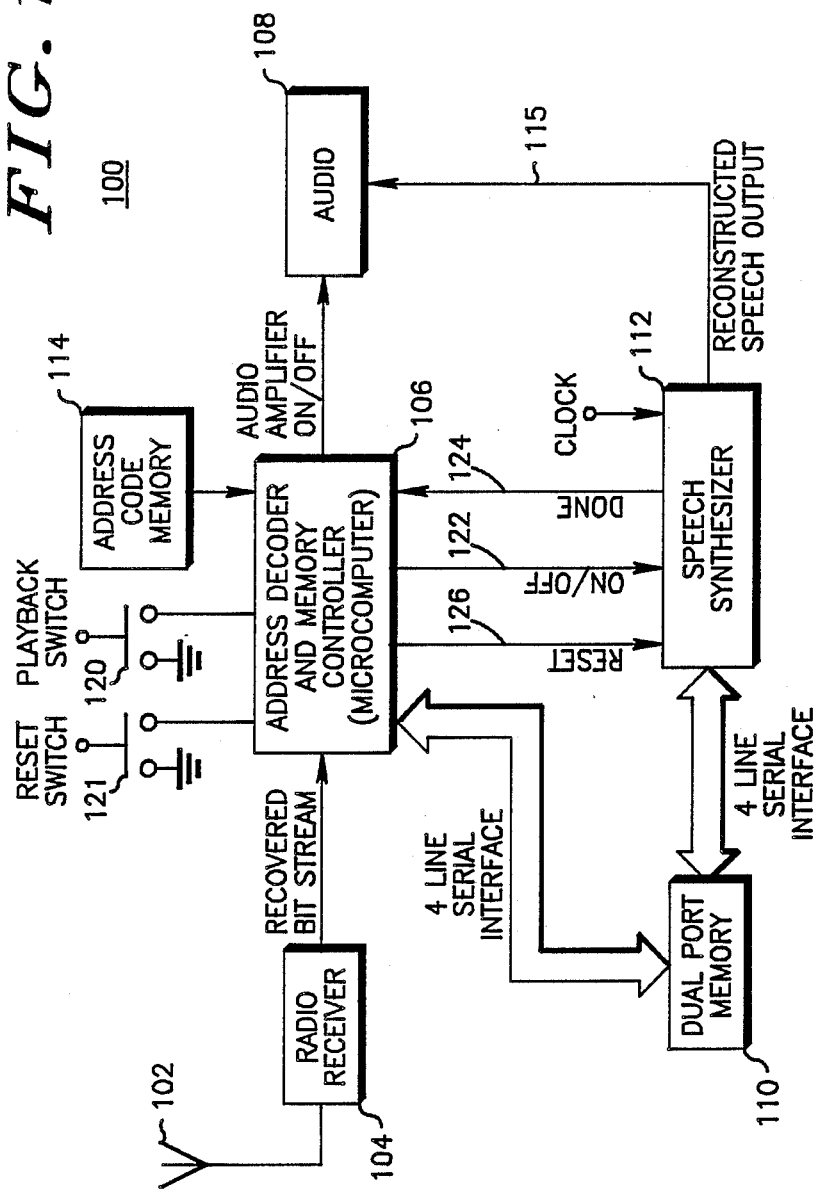

| HEXIDECIMAL ADDRESS LOCATIONS IN MEMORY | | |
|---|---|---|
| 0000 | COMMAND WORD 1 | 304 |
| 0001 | COMMAND WORD 2 | 306 |
| 0002 | MOST SIGNIFICANT BYTE OF START ADDRESS | 308 |
| 0003 | LEAST SIGNIFICANT BYTE OF START ADDRESS | 310 |
| 0004 | MOST SIGNIFICANT BYTE OF STOP ADDRESS | 312 |
| 0005 | LEAST SIGNIFICANT BYTE OF STOP ADDRESS | 314 |
| 0006 | M.S.B. OF MESSAGE 1 START ADDRESS | 316 |
| 0007 | L.S.B. OF MESSAGE 1 START ADDRESS | 318 |
| 0008 | M.S.B. OF MESSAGE 1 STOP ADDRESS | 320 |
| 0009 | L.S.B. OF MESSAGE 1 STOP ADDRESS | 322 |
| 0012 | M.S.B. OF MESSAGE 4 START ADDRESS | 340 |
| 0013 | L.S.B. OF MESSAGE 4 START ADDRESS | 342 |
| 0014 | M.S.B. OF MESSAGE 4 STOP ADDRESS | 344 |
| 0015 | L.S.B. OF MESSAGE 4 STOP ADDRESS | 346 |
| 0016 | FIRST BYTE OF MESSAGE MEMORY SPACE | |
| FFFF | LAST BYTE OF MESSAGE MEMORY SPACE | |

*FIG. 3*

COMMAND WORD 1 STRUCTURE

BIT 0: 0=MESSAGE 1 UNREAD, 1=MESSAGE 1 READ
BIT 1: 0=MESSAGE 2 UNREAD, 1=MESSAGE 2 READ
BIT 2: 0=MESSAGE 3 UNREAD, 1=MESSAGE 3 READ
BIT 3: 0=MESSAGE 4 UNREAD, 1=MESSAGE 4 READ
BIT 4: 1=MESSAGE AREAS 1 AND 2 MERGED
BIT 5: 1=MESSAGE AREAS 3 AND 4 MERGED
BIT 6 AND 7: LPC DATA RATE
  00: LPC DATA RATE = 2400 BITS PER SECOND
  01: LPC DATA RATE = 4800 BITS PER SECOND
  10: LPC DATA RATE = 7200 BITS PER SECOND
  11: LPC DATA RATE = 9600 BITS PER SECOND

*FIG. 4A*

COMMAND WORD 2 STRUCTURE

BITS 0 AND 1 DENOTE OLDEST MESSAGE IN MEMORY
BITS 2 AND 3 DENOTE SECOND OLDEST MESSAGE IN MEMORY
BITS 4 AND 5 DENOTE THIRD OLDEST MESSAGE IN MEMORY
BITS 6 AND 7 DENOTE LAST MESSAGE STORED IN MEMORY
FOR EACH TWO BIT MEMORY COMBINATION:
  BIT PATTERN 00 DENOTES MESSAGE AREA 1
  BIT PATTERN 01 DENOTES MESSAGE AREA 2
  BIT PATTERN 10 DENOTES MESSAGE AREA 3
  BIT PATTERN 11 DENOTES MESSAGE AREA 4

*FIG. 4B*

PROGRAM FLOW CHART FOR ADDRESS SIGNAL DETECTION

PROGRAM FLOW CHART
FOR ADDRESS DECODER
MICROCOMPUTER
SUB=ROUTINE
THAT LOADS SPEED
DATA INTO MEMORY

FLOW CHART SHOWING SUB-ROUTINE FOR MONITORING CONTROL SIGNALS INTO ADDRESS DECODER MICROCOMPUTER

PAGING RECEIVER WITH LPC SPEECH SYNTHESIZER

This is a continuation of application Ser. No. 815,477, filed 12/31/85 now abandoned.

This invention relates to the fields of radio paging receivers and voice synthesis. Specifically, a method and means of decoding and storing LPC messages in a paging receiver is provided.

BACKGROUND OF THE INVENTION

Typical voice-type paging systems have employed analog voice channels for the transmission of voice messages. While certain types of paging systems utilize binary signalling formats, transmission in an analog form remains the most common technique for voice signals. Paging systems that transmit analog representations of voice signals are limited in the number of paging subscribers that can be supported by one R.F. channel. In particular, due to the length of a voice message, which may range from five to over twenty seconds, only 1,200 to 1,500 customers can be supported on a typical tone and voice paging channel, while as many as 100,000 users can be supported on a channel that transmit only address signals. The limited number of users that can be placed on a voice channel, together with the limited number of channels available for paging, have several effects. First, the cost per user of the channel must be fairly high to support the cost of running the system. Second, until the release of 900 Mhz spectrum, there were not enough channels available to support the demand for tone and voice paging. Third, the lack of spectrum adversely affected the sales of new paging equipment.

In addition, the traditional analog signalling format does not provide several features that would be highly desirable. These include the ability to store a voice message in a reasonable size memory for recall at a later time, and the use of a digital modulation format to ease system problems. The use of Linear Predictive Coding (LPC) encoding of the speech at the terminal end of the paging system, and the subsequent storage and reconstruction of voice messages in paging receivers offers several improvements over present systems. First, present LPC technology allows good voice quality to be achieved at a data rate of 2400 bits per second. Using this voice data rate in conjunction with the 1200 bits per second digital modulation that can be used on paging transmitters increases the message throughput of a paging channel by a factor of five. Thus, the maximum number of users than can be placed on a tone and voice channel can be increased by a factor of five to 6,000 to 7,500. Furthermore, using LPC encoded speech data at 2400 bits per second permits speech messages to be stored in a reasonable size memory. That is, 26.667 seconds of speech can be stored in a 64K bit RAM for a 2400 bit per second data rate.

SUMMARY AND OBJECTS OF THE PRESENT INVENTION

In summary, the present invention provides a paging receiver adapted to decode and store LPC voice messages. The paging receiver of the present invention includes a receiver portion which produces a recovered bit stream. The recovered bit stream is processed by a microprocessor based address decoder. The address decoder cooperates with an address code memory, a dual port random access memory, and a speech synthesizer to store and decode the LPC voice signal. The stored message can be accessed at any time and converted to an analog voice signal by the speech synthesizer, and played to the user through the receiver's audio circuitry.

Accordingly, it is an object of the present invention to provide a receiver apparatus suitable for use with digitally encoded voice messages.

It is another object of the present invention to provide a receiver apparatus that can receive and store digitally encoded messages in real time.

It is another object of the present invention to provide a receiver apparatus which can store messages with a reasonable amount of memory.

It is yet another object of the present invention to provide a paging receiver apparatus that can play back stored digitally encoded voice messages.

It is still another object of the present invention to provide a paging receiver apparatus which can simultaneously store and play voice messages.

It is still another object of the present invention to provide a paging receiver structure which can record one message while the another message is being reproduced.

Additional features, objects, and advantages of the paging receiver with LPC speech synthesizer of the present invention will be more clearly comprehended by the following detailed description together with the accompanying drawings.

BRIEF DESCRIPTION OF THE DRAWINGS

FIG. 1 is a block diagram of the paging receiver apparatus of the present invention.

FIG. 3 is a memory map detailing the memory allocation and operation of the dual port memory described in conjunction with FIG. 1.

FIGS. 4A and 4B are diagrams detailing the format of the command words described in conjunction with FIG. 3.

DETAILED DESCRIPTION OF THE DRAWINGS

Figure 2A:
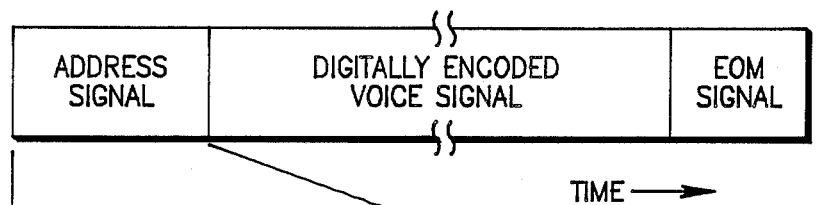
FIGS. 2A, 2B, 2C and 2D are timing diagrams showing a paging signalling scheme incorporating the selective signalling and formatted LPC digital voice information processed by the paging receiver of the present invention.

FIG. 1 is a block diagram of the LPC paging receiver of the present invention. This structure allows LPC encoded speech signals to be received and stored in a memory for reconstruction and playback at the discretion of the paging user. Further, it also allows for the storage of more than one message, and allows one speech message to be played back while a new message is being received and stored. Further, the stored messages can be of variable length without wasting memory space for each message.

The paging receiver 100 includes a conventional radio receiver 104 and an antenna 102. The radio receiver 104 provides a recovered bit stream comprising the LPC encoded voice message as well as the pager address information. The recovered bit stream is processed by an address decoder 106 which also controls the overall operation of the paging receiver. The address decoder 106 is further coupled to an address code memory 114, an audio circuit 108, a dual port memory 110, and a speech synthesizer 112. The address code memory 114 contains the pager identification number(s) which are used to selectively signal the particular paging devices. The dual port memory 110 is used to store the LPC encoded voice messages. The features and advantages of the dual port memory, as employed by the present invention, will be discussed more fully below. The speech synthesizer 112 is coupled to both the dual port memory and the microprocessor 106 for reasons which will be discussed in detail below. Briefly, however, the address decoder acts as a selective signalling decoder that stores LPC encoded signals that are addressed to the individual pager, and the speech synthesizer reads the LPC encoded signals stored in the dual port memory 110 and converts them to an analog voice signal which is processed by audio circuitry 108. While the combination of the elements which comprise the paging receiver of the present invention is unique and novel in the art, several of the elements used to construct the paging receiver of the present invention are well known to those skilled in the art.

For example, the radio receiver 104 may be a conventional FM receiver adapted to provide a base band output. The address decoder 106 may be a microprocessor device such as a MC146805C4, manufactured by, and available from the Microcomputer Division of Motorola Semiconductor Products Inc., with headquarters in Austin, Tex. The address code memory may be a conventional read-only memory (ROM). A paging receiver having a microcomputer based decoder suitable for use with the present invention is described in U.S. Pat. No. 4,518,961 entitled "Universal Paging Device With Power Conservation" filed Jan. 30, 1984, invented by Walter L. Davis et al., and assigned to the assignee of the present invention. The dual port memory is a random access memory (RAM) which may be accessed from either of two ports. This device could be of the type TMS4161 available from Texas Instruments of Dallas, Tex.

While the teachings of the present invention are set forth in the context of LPC encoded speech, several digital speech encoding techniques could perform satisfactorily with the receiver structure of the present invention. The choice of speech synthesizers therefore depends on the type of speech encoding used. The preferred embodiment of the present invention utilizes a speech synthesizer of the type described in U.S. Pat. No. 4,389,537, filed Oct. 3, 1983 entitled "Voice Warning System for An Automotive Vehicle Provided With An Automatic Speed Control Device", invented by Tsunoda et al. For the foregoing, the above patents, articles, and instruction manuals are herein incorporated by reference.

Referring still to FIG. 1, the operation of the paging receiver may be described as follows. The address decoder/controller 106 searches for an address signal (or signals) that indicate a message is being sent to the pager. The decoder/controller would typically be a multiaddress, multifunction decoder, and one or more of the addresses or functions would be associated with an LPC voice message. Multiaddress/multifunction decoders are further described in U.S. Pat. No. 4,518,961 cited above.

When the decoder/controller 106 receives one of the address signals that indicate an LPC encoded speech message is forth-coming, the address decoder activates the dual port memory 110 and serves to receive the incoming bit stream that comprises the speech messages and store it in the dual port memory 110 via one of its input ports. After the entire speech message has been received, the decoder/controller 106 turns on the audio amplifier (or a similar alerting device) and generates an output signal to indicate that a message has been received.

When the user wishes to listen to the stored voice message, he activates a playback or "listen" control 120 that has an input to the address decoder. This input causes the decoder/controller to turn ON the synthesizer via the ON/OFF control line 122, and the synthesizer reproduces the stored voice message through the audio circuit 108, in accordance with instructions deposited in the memory by the decoder/controller 106.

FIGS. 2A through 2D are a series of timing diagrams which detail a typical signalling scheme that could be used to communicate signalling and voice information to the paging receiver of the present invention. FIG. 2A shows the overall format of the paging messages. According to FIG. 2A, a typical paging message would include an address signal followed by a digital encoded LPC voice signal. An end-of-message (EOM) signal terminates the message.

Figure 2B:
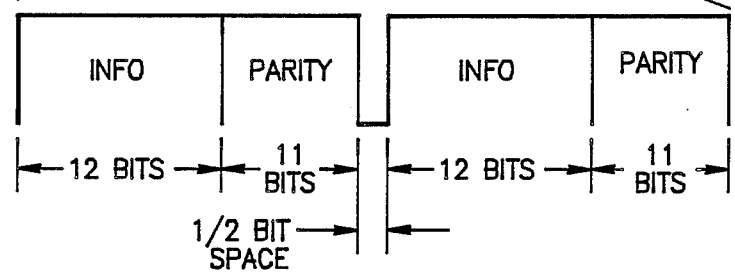

FIG. 2B is an expanded representation of the address signal described above in conjunction with FIG. 2B. The preferred embodiment of the present invention employs a dual word address signalling scheme which is well known to those of ordinary skill in the art. This address signalling scheme, referred to as the 'Echo' code, is described in detail in U.S. Pat. No. 4,518,961, cited above. As shown in FIG. 2B, the address signal is formatted as two digital 23 bit words that consist of 12 bit information bits, followed by an 11 bit parity bits. The first digital word comprising the information and parity words is referred to as the 'A' address. The second word is referred to as the 'B' address. The 'A' address and the 'B' address are separated by a ½ bit timing space. The 'A' address and the 'B' address may be combined in several ways to provide multi-function signalling to the paging device, as shown in the cited reference. Briefly, by detecting the reception of words A and B or their binary complements, four different functions can be provided for any assigned set of A and B words. While the preferred embodiment of the present invention is disclosed in the context of the 'Echo' code, those skilled in the art will appreciate that many other address signalling schemes would also function satisfactorily.

Figure 2C:
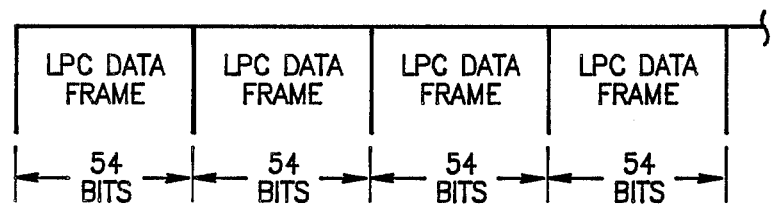
Figure 2D:
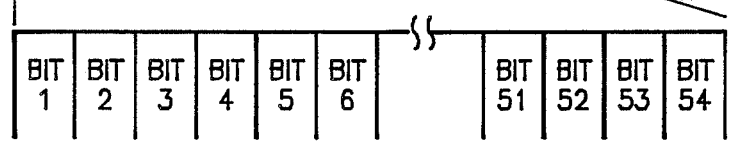

FIG. 2C is a timing diagram showing the format of the digitally encoded voice signal described above in conjunction with FIG. 2A. The present invention utilizes a well known LPC encoding format referred to as LPC-10. This LPC format was developed by the Department of Defense, and is discussed in detail in an article by Thomas E. Tremain, entitled "The Government Standard Linear Predictive Coding Algorithm: LPC-10" appearing in Speech Technology, p. 40, April 1982. As shown in FIG. 2C, the digitally encoded speech signal is formatted as a group of LPC data frames comprised of a predetermined number of bits. LPC-10 employs frames having 54 bits as shown in FIG. 2D. Each frame of LPC data contains one set of LPC parameters which are defined below in Table 1.

Table 1 is a table which defines the function of each bit (per frame) as shown above in FIG. 2D. Table 1 is a reproduction of the contents of a table which was published in Tremain's article mentioned above.

TABLE 1

| | Transmitted Bit Stream | | | | |
|---|---|---|---|---|---|
| Bit | Voiced | Unvoiced | Bit | Voiced | Unvoiced |
| 1 | K1-0 | K1-0 | 28 | K2-4 | K2-4 |
| 2 | K2-0 | K2-0 | 29 | K7-0 | K3-5 |
| 3 | K3-0 | K3-0 | 30 | K8-0 | R-5 |
| 4 | P-0 | P-0 | 31 | P-4 | P-4 |
| 5 | R-0 | R-0 | 32 | K4-4 | K4-4 |
| 6 | K1-1 | K1-1 | 33 | K5-0 | K1-5 |
| 7 | K2-1 | K2-1 | 34 | K6-0 | K2-5 |
| 8 | K3-1 | K3-1 | 35 | K7-1 | K3-6 |
| 9 | P-1 | P-1 | 36 | K10-0 | K4-5 |
| 10 | R-1 | R-1 | 37 | K8-1 | R-6 |
| 11 | K1-2 | K1-2 | 38 | K5-1 | K1-6 |
| 12 | K4-0 | K4-0 | 39 | K6-1 | K2-6 |
| 13 | K3-2 | K3-2 | 40 | K7-2 | K3-7 |
| 14 | R-2 | R-2 | 41 | K9-0 | K4-6 |
| 15 | P-2 | P-2 | 42 | P-5 | P-5 |
| 16 | K4-1 | K4-1 | 43 | K5-2 | K1-7 |
| 17 | K1-3 | K1-3 | 44 | K6-2 | K2-7 |
| 18 | K2-2 | K2-2 | 45 | K10-1 | D/C |
| 19 | K3-3 | K3-3 | 46 | K8-2 | R-7 |
| 20 | K4-2 | K4-2 | 47 | P-6 | P-6 |
| 21 | R-3 | R-3 | 48 | K9-1 | K4-7 |
| 22 | K1-4 | K1-4 | 49 | K5-3 | K1-8 |
| 23 | K2-3 | K2-3 | 50 | K6-3 | K2-8 |
| 24 | K3-4 | K3-4 | 51 | K7-3 | K3-8 |
| 25 | K4-3 | K4-3 | 52 | K9-2 | K4-8 |
| 26 | R-4 | R-4 | 53 | K8-3 | R-8 |
| 27 | P-3 | P-3 | 54 | Sync | Sync | where:
Bit 0 is LSB
Order of transmission is bit 1 to bit 54
P is pitch
R is RMS
K is reflection coefficients
Bit 0 is LSB of voice data
Bit 5 is LSB of parity for RMS and reflection coefficients According to Table 1, each frame contains the information necessary to communicate information about the excitation source and 10 LPC reflection coefficients per frame. Each LPC reflection coefficient is defined according to bits represented as Kn in Table 1. Each reflection coefficient is complemented by a 'P' bit which indicates pitch and an 'R' bit which indicates RMS power. The last bit of the frame is reserved for synchronization. The LPC-10 excitation and reflection coefficient information shown in Table 1 can be used to reconstruct the original speech message, and the method of performing this reconstruction is well known in the art.

While the preferred embodiment of the present invention relies on LPC-10 signalling, other versions of LPC or other digital formats would work equally well. One technique such as CVSD encoding could be employed with a slight modification to the receiver and a significantly larger memory. The larger memory would be required because CVSD encoding is not a particularly efficient method of encoding speech.

Referring now to FIG. 3, there is shown a memory map detailing the operation of the dual port memory 110 described above in conjunction with FIG. 1. According to FIG. 3, there are six memory locations 304, 306, 308, 310, 312, and 314 in the dual port memory that serve as a "scratch pad" communications link between the decoder/controller 106 and the speech synthesizer 112. The memory locations represented by blocks 304, 306, 308, 310, 312, and 314 are written into by decoder/controller before it turns on the speech synthesizer 112. The memory locations 304 and 306 represent two control words. A two byte starting address location is represented by 308 and 310, and a two byte stop address location is represented by memory locations 312 and 314. The memory locations with hexidecimal addresses 0006 through 0015 and labeled 316 through 345 respectively, are used to store the start and stop locations of each of the four messages that can be stored in the memory. The remaining memory locations 0016 to FFFF are used to store the variable length LPC voice messages made possible by the memory structure of the present paging receiver. The memory map shown in FIG. 3 is based on the assumption that the paging receiver is constructed with a receiver having an 8 bit microprocessor with a 64K bit random access memory. Those skilled in the art will appreciate that the receiver structure of the present invention may be expanded to include microcessors and memories using any number of bits.

In operation, the address decoder and memory controller 106 reads and updates the information stored in the control word locations 304, and 306 and instructs the speech synthesizer to "talk" or reproduce the speech data contained between the starting address location stored in 308 and 310 and the stopping address location stored in 312, and 314. The information contained in the starting and stopping address fields may also be updated at the same time the command words 304 and 306 are updated. The decoder/controller 106 then activates the speech synthesizer 112 by raising the ON/OFF output line 122 to a high or ON state. Upon being turned ON, the memory controller portion of the synthesizer 112 accesses the dual port memory 110 and reads the command words 304 and 306. It then reads the starting and stopping address locations, and reproduces the speech message stored in the memory between the starting and stopping address locations.

The memory conserving technique described above has several advantages. First, it conserves memory in that memory is not wasted as it would be if there were fixed memory boundaries, and a short message was received. Second, it allows for variable length messages to be stored. That is, there are no fixed constraints on message length other than the total size of memory. Third, the synthesizer does not have to be programmed with any prior information about the starting and stopping locations of all message locations. Finally, the systems allows extra memories, both RAM and ROM, to be added without affecting the design or programming of the synthesizer. Thus, the system can be used to reproduce canned messages out of a ROM as well as real time received messages. Furthermore, because of the unique dual-port memory structure, the receiver can receive and store one message while a previous is being reproduced.

FIG. 4A and 4B are diagrams detailing the format of the control or command words described in conjunction with FIG. 3. The control words shown in FIG. 4A and 4B are used to inform the memory control circuitry as to the data rate and location of the stored LPC voice messages. In addition, the first control word is used to store status information indicating whether particular messages have been 'read' previously. Referring now to FIG. 4A, the first command word comprises an 8 bit field. Bits 0 to Bit 3 store message status information. For example, if bit 1 is a zero, message one has not been read. If bit one is a binary 1, then message 1 has been read.

Bits 4 and 5 are used to facilitate the storage of very long messages and the status of the field formed by bits 4 and 5 allow the message areas to be merged in any combination. Bits 6 and 7 are used to indicate the data rate of the LPC voice message. The bits are used in systems which employ variable bit rate speech encoding and they may be omitted or ignored in fixed data rate systems. A paging system having variable bit rate LPC speed encoding is described in a copending patent application attorney's docket number CM-00258J, entitled "Paging System Having Variable Bit Rate Speech Encoding", invented by Walter L. Davis, and filed of even date herewith.

Referring now to FIG. 4B, the command word 2 structure is shown in detail. The command word 2 is used to indicate the chronological order or each stored message. Bits 0 and 1 denote the oldest message stored in memory. Bits 2 and 3 denote the second oldest message in memory. Bits 4 and 5 denote the third oldest message in memory. Bits 6 and 7 denote the last message stored in memory. Each two bit field will show the following bit pattern. Bit pattern 00 denotes message area 1. Bit pattern 01 denotes message area 2. Bit pattern 10 denotes message area 3. Bit pattern 11 denotes message area 4. The retention of historical data on messages permits the user to discard the older messages if additional memory is required for other messages.

Figure 5A:
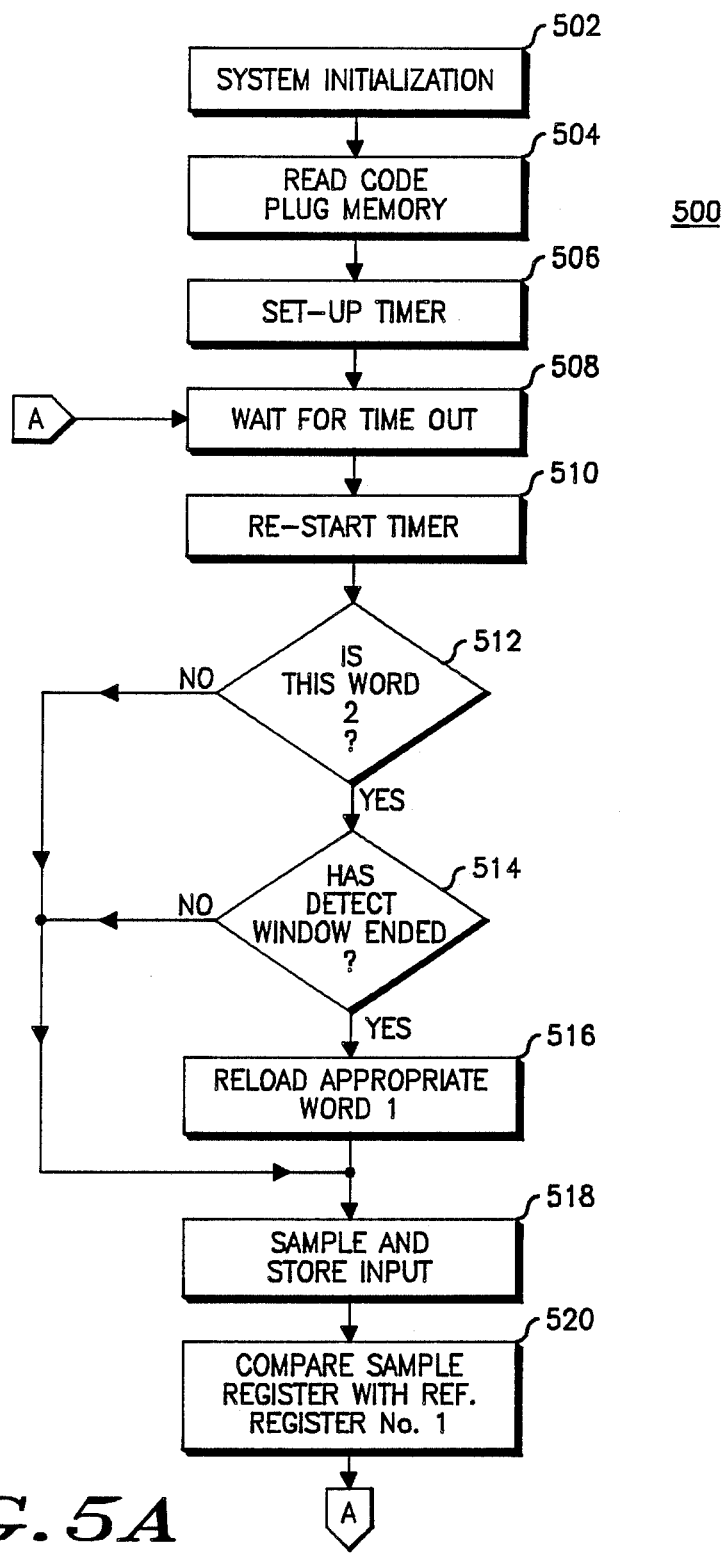
FIGS. 5A, 5B, and 5C are flow diagrams detailing the method by which the address decoder of FIG. 1 decodes the address signal of FIG. 2B.

Referring now to FIG. 5, there is a flow diagram detailing the operation of the address decoder 106 of FIG. 1 as it relates to the decoding of the dual word address signalling scheme employed by the present invention. The routine 500 is activated when the device is turned-on, and the system is then initialized at 502. Item 504 is then selected to read the address code memory for the unique paging address or addresses corresponding to each particular paging device. The contents of the address code memory are then stored in a RAM location defined as the reference register. A timer is set by item 506 to establish the bit sampling period described in detail in U.S. Pat. No. 4,518,961 mentioned above. Item 508 provides a wait for time out function and is used as part of an energy conservation technique. The output of waiting block 508 is connected to item 510 to restart the timer to time the interval to the next bit sample, and the address decoding algorithm is then executed using the updated signal sample set. The output of item 510 is coupled to decision block 512. Decision block 512 tests whether or not the current word being decoded is the second word of an address. The YES branch from decision 512 is connected to decision 514. Decision 514 determines whether or not the time window for detecting a word 2 has elapsed. The yes branch from decision 514 is connected to item 516 directing the reloading of address word one. The negative branches of decisions 512 and 514, along with the output of reload word one item 516, are connected to a sample and store input 518.

Block 518 is representative of the sampling and storing operation used to detect the address word for the individual paging device. The output of sample and store block 518 is connected to block 520 labeled compare sample register with reference register 1. As will be described in greater detail, reference register 1 at this point contains the pager address word. The output of compare block 520 is connected to a connect point labeled with the alphabetic character A which is replicated on FIG. 5B.

Figure 5B:
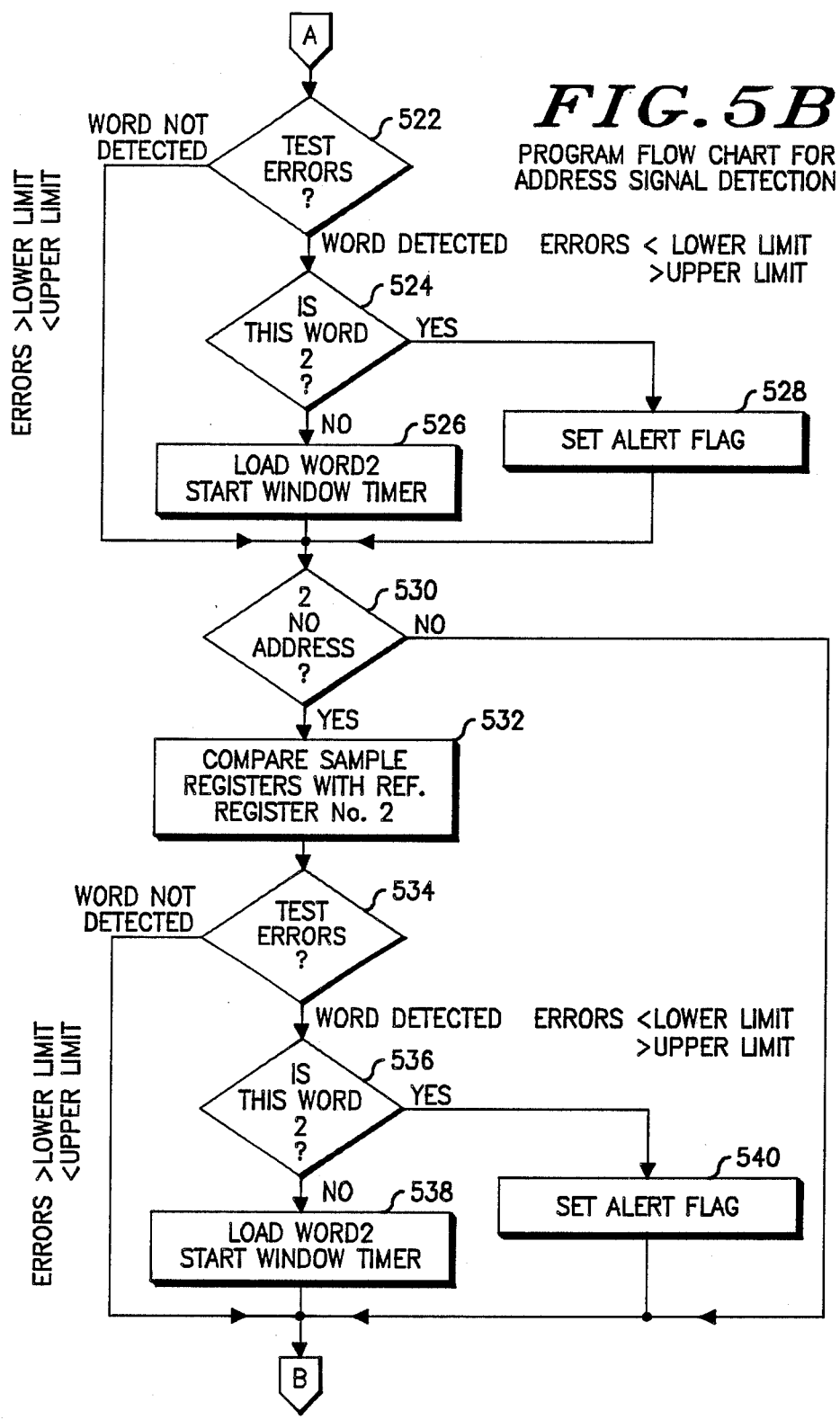

FIG. 5B shows point A connected to a decision block 522. The work detect branch from decision block 522 is connected to a second decision block 524 which determines whether or not this is a word 2. The negative branch from decision block 524 is connected to block 526 which orders the loading of word 2 and the restarting of the timer. The YES branch from decision block 524 is connected to a set alert flag block 528. The excessively high and low limit branch from test error decision block 522, together with the output of the load word 2 and start timer block 526 and the output of set alert flag block 528, are connected to a decision block 530.

The next series of tests and command blocks, which end at connect point B, are applicable to the detection of a second address, i.e. a second set of A and B code word. Paging receivers in the ECHO system may have two independent addresses and up to eight output or alert functions. Decision block 530 tests whether there is a second address in the address code memory. The NO branch from decision block 530 is connected to connect point B. The YES branch of decision block 530 is connected to block 532 which compares the sample register with the reference in register 2. Register 2 contains an address word of the second independent address. The output of compare block 532 is connected to decision block 534. Decision block 534 tests the error limit for the comparison operation commanded by block 532. The word detect branch from decision block 534 is connected to a decision block 536. Decision block 536 tests whether or not this is a second word. The NO branch from decision block 536 is connected to block 538 which causes the loading of word 2 and restarting of the timer. The YES branch of decision block 536 is connected to set alert flag block 540 to indicate that one of the functions associated with the second address has been detected. The excessively high or low limit branch from test error decision block 534, the output of load word 2 block 538 and the output of set alert flag block 540 are all connected to exit point B.

Figure 5C:
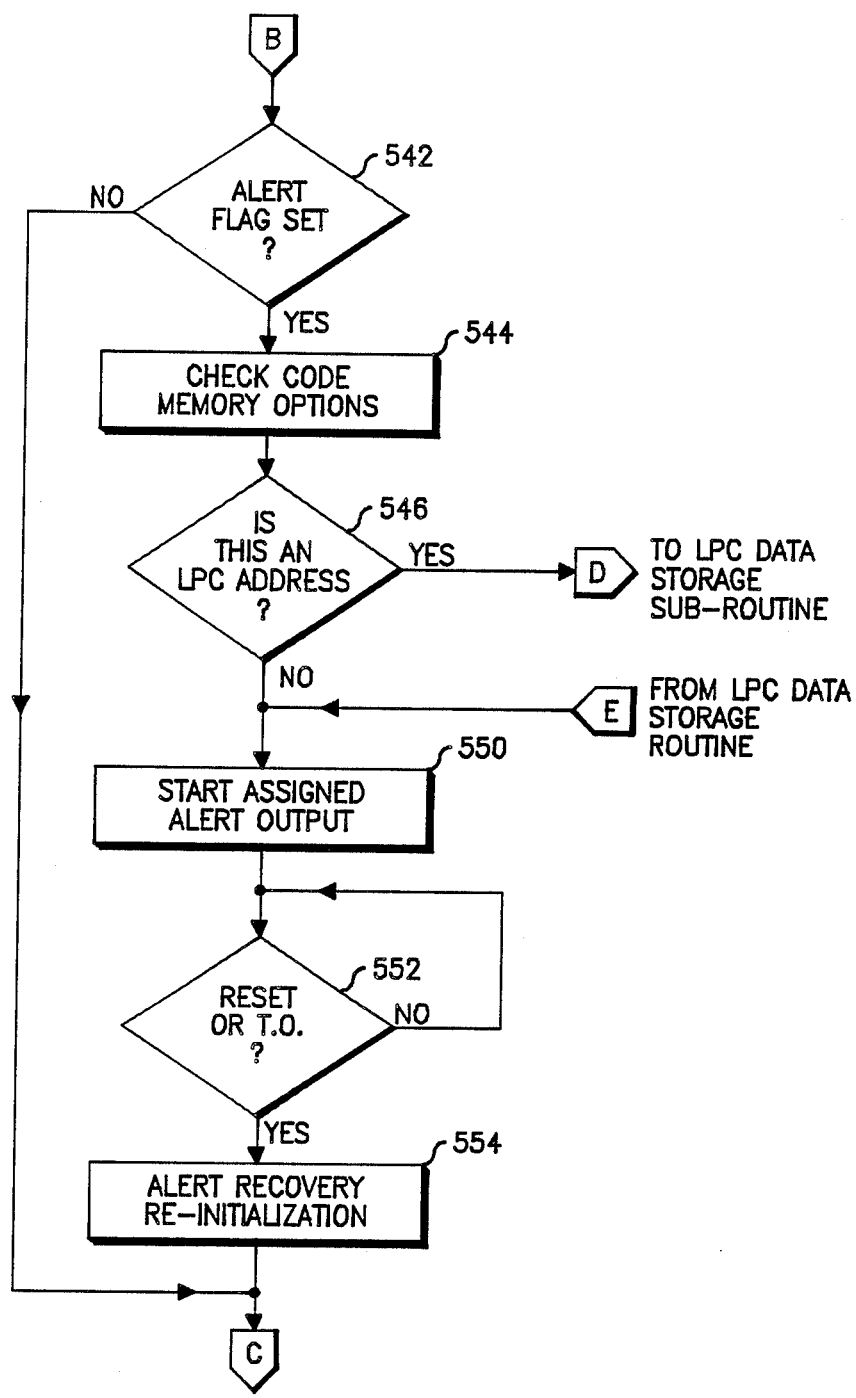

FIG. 5C shows point B connected to a decision block 542. Decision block 542 determines whether or not an alert flag has been set, that is, whether or not a valid address signal has been detected. The YES branch from decision block 542 is connected to the check code memory options block 544. The output of block 544 is connected to the decision block 546, which tests whether the detected address is associated with an LPC data transmission. The yes branch of block 546 is connected to point D which is connected to the output of alert recovery block 554 is connected to point C that is connected to the subroutine shown in FIG. 7 that monitors the reset and playback inputs to the address controller. The output of decision 546 is coupled to the start assigned alert output block 550. The output of block 550 is connected to decision block 552. Block 552 resets the alert output if an external reset signal is received, or if an automatic time out reset occurs. The regative branch of decision block 552 is connected back to its input. The YES branch of decision block 552 is connected to an alert recovery reinitialization block 554.

Functionally, the program represented by the flowchart directs the address controller to function to decode addresses in the manner detailed in the U.S. Pat. No. 4,518,961. Thus, after some turn-on initialization procedures that start at block 502, the program sequence directs the search for a word 1 that matches a word 1 stored in the code memory. Then it directs the search for a word 2 that must be detected within a narrow time window after the detection of word 1, otherwise, the decoder goes back to searching for word 1.

The program directs that the input be sampled at the appropriate time (block 508 through 518), and that the samples be stored in appropriate registers (block 518). Then, the contents of the sample register are compared with the address or addresses contained in the code plug memory. In the steps represented by blocks 522, 524, 526 and 528, the samples are compared with an address word of a first address, and in the steps represented by blocks 532, 534, 536, 538, and 540, the sample registers are compared with a second address. This scheme thus permits eight possible combinations of sequential words and their inverses to be directed.

In each of the decoding steps, the program generates an alert signal if an assigned address signal is received, and this alert signal or flag is decoded in the section of the program represented by blocks 542, 544, 546, 550, 552 and 554 and an appropriate alert signal is generated.

Figure 6:
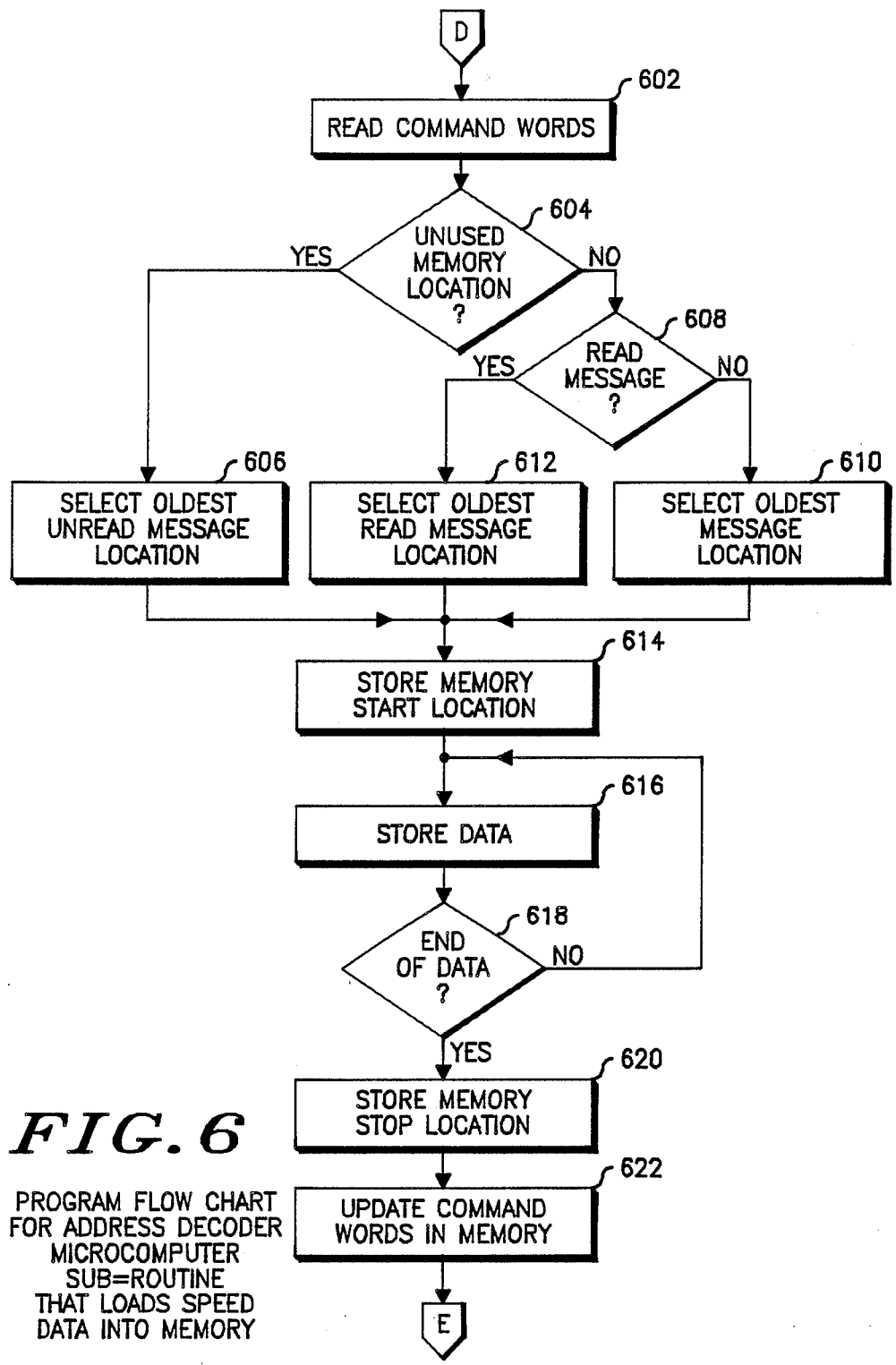
FIG. 6 is a flow diagram detailing the operation of the address decoder routine which loads speech data into the dual port memory of FIG. 1.

FIG. 6 is a flow diagram detailing the operation of the address decoder routine 600 which loads speech data into the dual port memory of FIG. 1. The routine 600 is activated via entry point D whenever a new LPC encoded speech message is received. Whenever the routine 600 is activated, item 602 fetches the command words stored in the memory map 'scratch pad' area mentioned above. Decision 604 determines whether any empty unused message locations are currently available. If a message location is available, the routine branches to time 606 which selects the oldest unread message location. If a new message location is not available, the routine must decide where to store the new message. The preferred embodiment of the present invention prioritizes messages based on whether old messages have been read or not. Other prioritization schemes could also be employed and all such prioritization schemes are anticipated by the spirit of the teachings of this invention. Decision 608 examines each message location to determine whether any messages have been read. If any message has been read, item 612 selects the oldest read message location to store the new message. If no messages have been read, item 610 selects the oldest mesage location for storage of the message. Each of the above decision paths ultimately selects item 614 to update the memory start location indicator. Item 616 stores the LPC voice message while decision 618 continuously checks the bits stream for the end of message pattern. When the message is complete, Item 620 calculates the memory stop location and item 622 updates the memory location indicators in the scratchpad area. Then, the subroutine returns to the main program at point E in FIG. 5C, and an alert is generated to indicate that a page has been received and stored.

Figure 7:
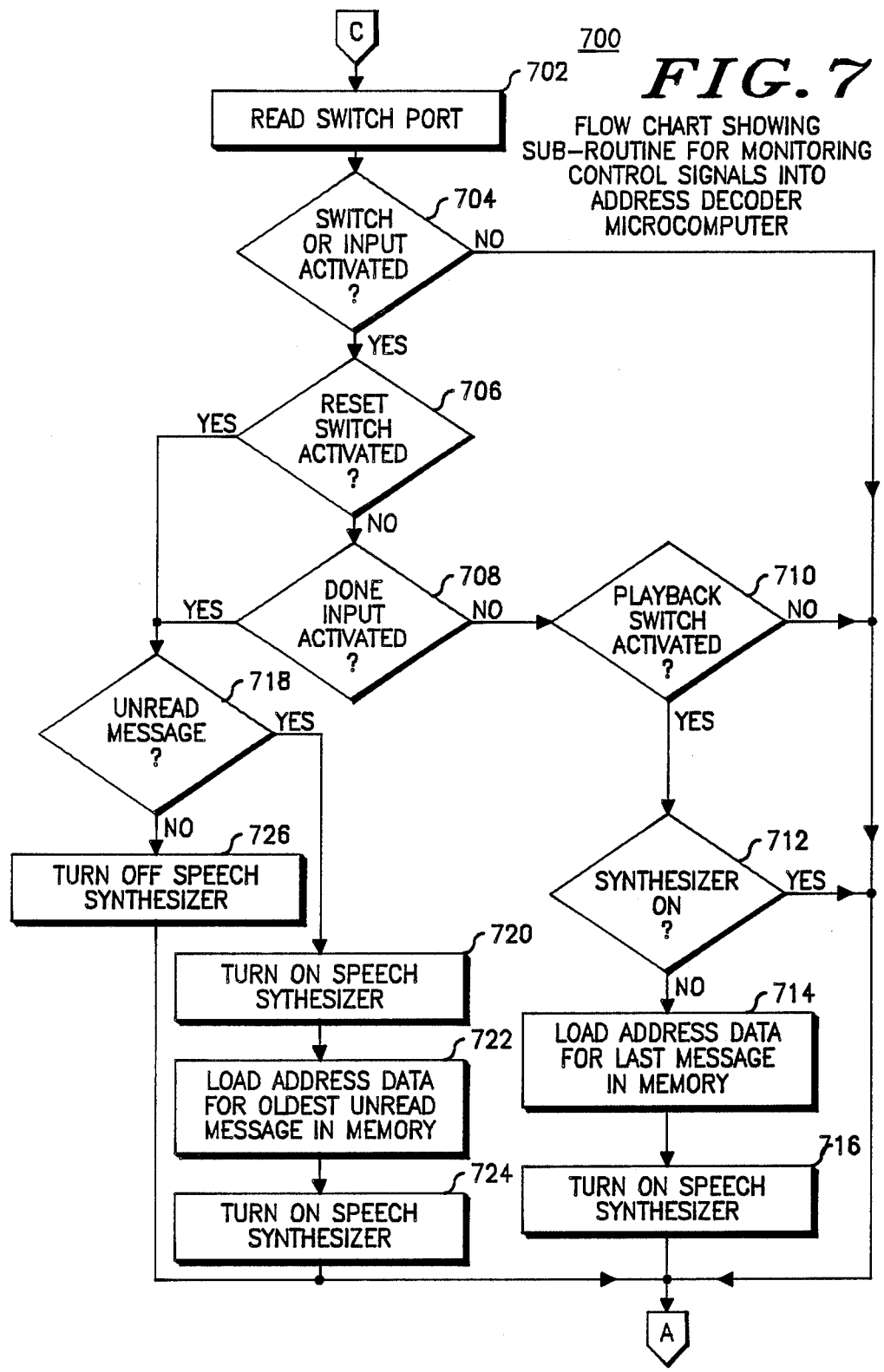
FIG. 7 is a flow diagram detailing the operation of the address decoder routine for monitoring control signals into the address decoder microcomputer.

FIG. 7 is a flow diagram detailing the operation of the address decoder routine 700 for monitoring signals which control the address decoder microcomputer 106 of FIG. 1. The routine 700 is activated during every bit sample interval to examine the status of the user controlled input switches the paging receiver. Input C from FIG. 5C is connected to item 702 which examines each control input. Decision 704 then determines whether any switch has been activated. If a switch has been activated, decision 706 determines whether it was the reset switch. If the reset switch was detected, decision 718 determines whether the paging receiver has received and stored any LPC encoded voice messages since the receiver was last reset, that is, if there is an unread message stored in memory. If an unread mesage is present in memory, item 720 is selected to disable the speech synthesizer 112. Item 722 then fetches the address data for the oldest unread message in memory and stores this information in the command word location. Item 724 then activates the synthesizer and its memory controller. The operation of the synthesizer and its memory controller are discussed in more detail below. The routine returns to return point R after the message playback has been completed. If no unread messages were found in memory, decision 718 selects item 726 to disable the synthesizer 112 and return to return point R. If the monitor routine 700 is activated while a stored LPC voice message is being played, decision 706 selects decision 708 to determine whether the speech synthesizer 112 had detected the end of the message and activated the 'done' control 124. If the 'done' control 124 was active, decision 718 is selected to determine whether any other unread messages are present in memory. The decision path described above is then repeated. If a message was not being played, decision 710 is selected to determine whether the playback control 120 has been activated. If the playback switch 120 is active, decision 712 is selected to determine whether the synthesizer and memory controller 112 are active. If the synthesizer and memory controller 112 are active, decision 712 returns to return point R. If the synthesizer and memory controller 112 are not active, item 714 retrieves the load address for the last message loaded into memory. Item 716 then activates the speech synthesizer to reproduce the message indicated by the retrieved load address. If decision 710 did not detect an active playback switch, it returns to return point R. At the return point R on FIG. 5A, the decoder waits for the timer to time out another data sample interval. The operation of the subroutine 700 causes any unread messages to be played back whenever the playback or reset controls are activated. In the absence of an unread message, the activation of the playback control plays back the last recorded message received.

Figure 8:
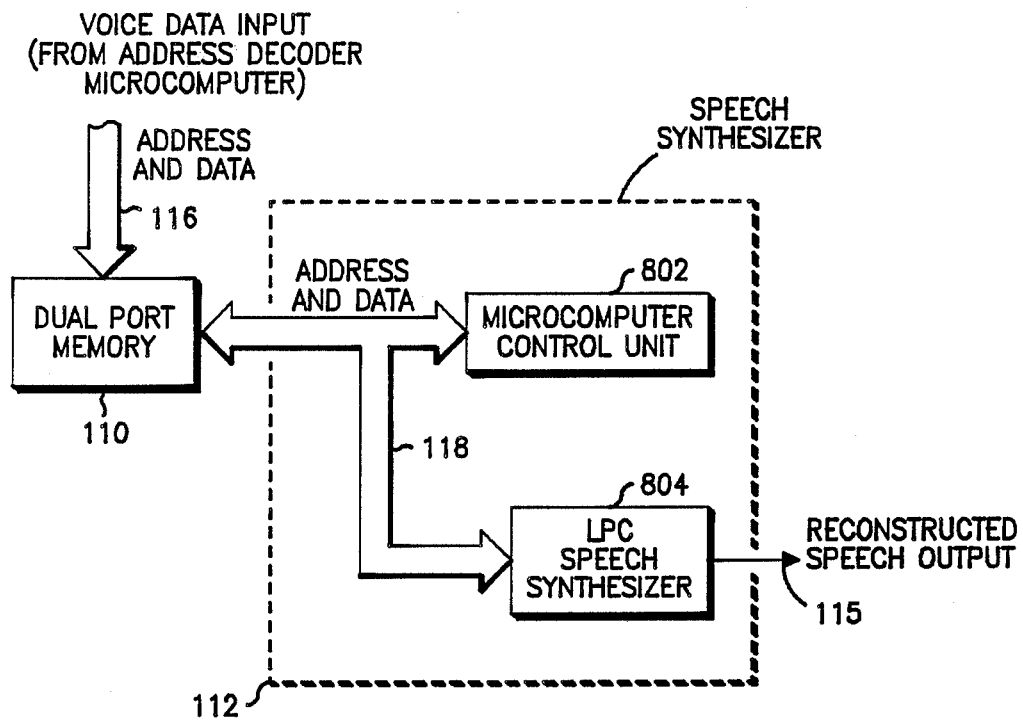
FIG. 8 is a block diagram showing the structure of the dual port memory/speech synthesizer interface circuitry.

FIG. 8 is a block diagram showing the structure of the dual port memory/speech synthesizer interface circuitry of the paging receiver of the present invention. The LPC speech synthesizer 112 of FIG. 1 includes a microcomputer control unit 802 and an LPC speech synthesizer. An address and data bus 118 is coupled between the microcomputer control unit 802 and the LPC speech synthesizer 804. The address and data bus 118 is also coupled to one port of the dual port memory 110. Another port of the dual port memory 110 is coupled to the microcomputer and memory control unit 106 of FIG. 1 through the address and data bus 116. The reconstructed speech signal is produced at terminal 115 of the LPC speech synthesizer 804.

The microcomputer control unit 802 reads the contents of the control word described above and retrieves messages and presents them to the synthesizer 804 as instructed by the control word. The detailed operation of the control word is further described in conjunction with FIG. 10.

Figure 9:
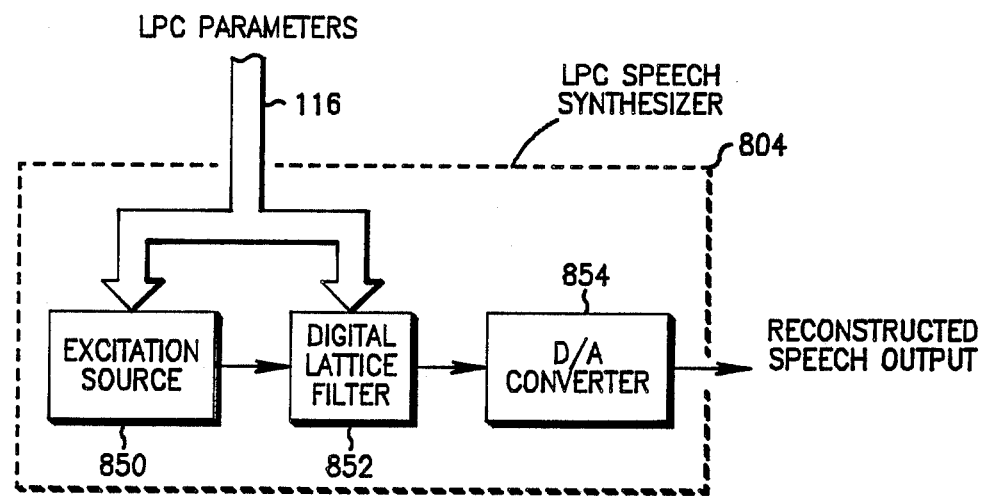
FIG. 9 is a block diagram of speech synthesizer apparatus suitable for use with the present invention.

FIG. 9 is a block diagram of speech synthesizer apparatus 804 if FIG. 8. The LPC speech synthesizer includes an excitation source 850 and a digital lattice filter 852 which generate speech signals based on information received over the address and data bus 116. The LPC parameters used by the excitation source 850 indicate whether a particular sound is voiced or unvoiced. The digital lattice filter 852 will then modify this signal based on a series of reflection coefficients received over the address and data bus 116. The digital output of the digital lattice filter 852 is converted to reconstructed analog speech by the D/A converter 854. One example of a speech synthesizer having a microcomputer control unit which would perform satisfactorily with the LPC system of the present invention is described in U.S. Pat. No. 4,389,537, filed Oct. 3, 1980, invented by Tsunoda et al. Other well known LPC speech synthesizes could also be employed.

Figure 10:
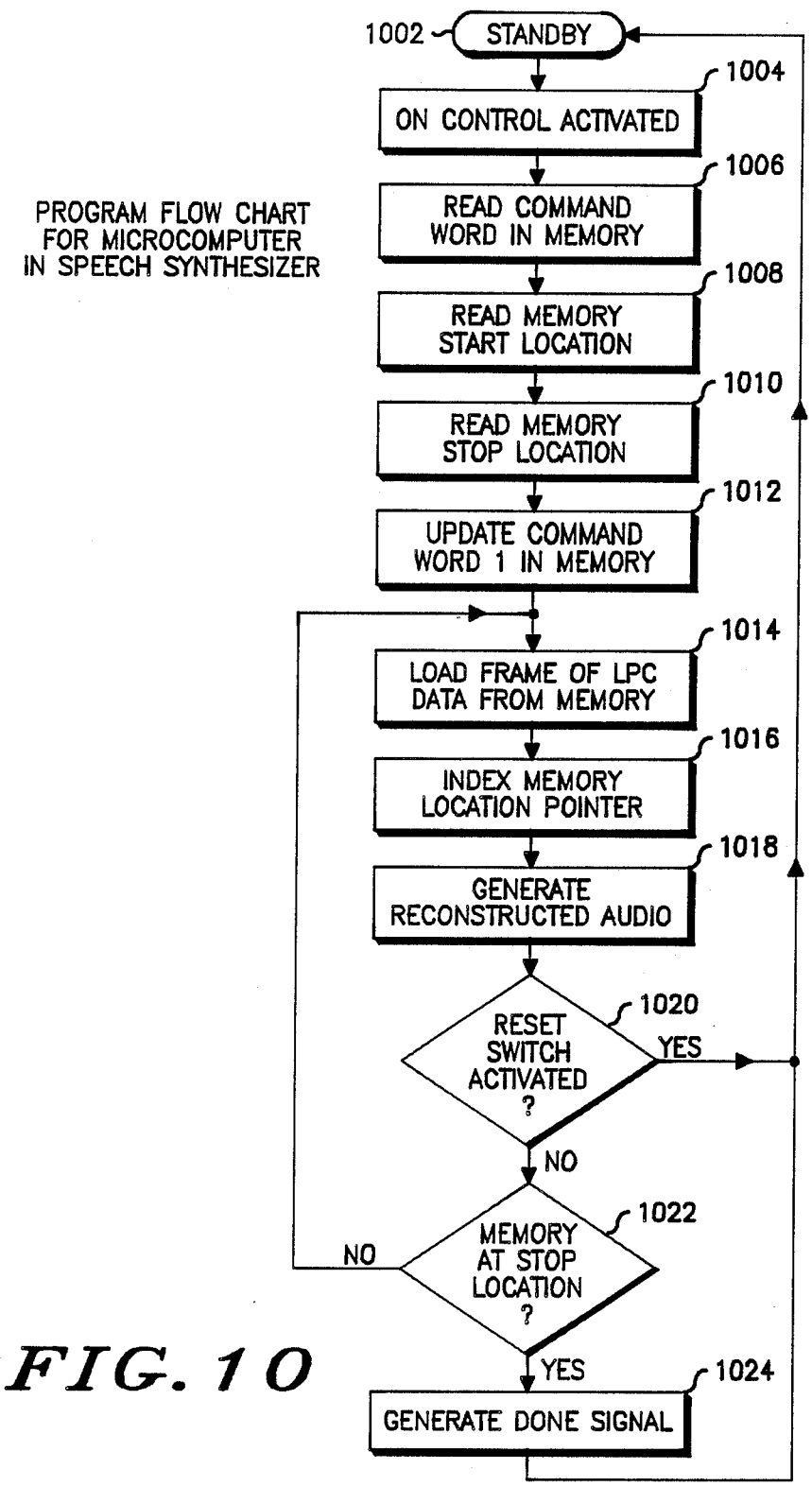
FIG. 10 is a flow diagram of the operation of the speech synthesizer microcontroller of FIG. 8.

FIG. 10 is a flow diagram of the operation of the speech synthesizer microcomputer 802 of FIG. 8. The routine 1000 typically is resident in the standby mode. Item 1004 is selected whenever the 'ON' control 122 is activated. Item 1006 reads the command words into memory and item 1008 determines the memory location corresponding to the start of the message. Item 1010 determines the address of the last byte of message in memory. Item 1012 updates the command word 1 in memory to indicate that the message is now a read message. Item 1014 then a frame of LPC information from memory. Item 1016 then updates the index memory pointer for the next byte. The LPC speech is reconstructed by item 1018. Decision 1020 then tests to determine whether the reset input was activated. If the reset input was activated, the YES branch returns to standby at 1002. Decision 1022 tests the data to determine whether the memory stop location is the current location. If not, item 1014 is selected to retrieve the next LPC frame. If the entire message has been played, decision 1022 selects item 1024 to generate the done signal produced at terminal 124.

While specific embodiments of this invention have been shown and described, further modifications and improvements will occur to those skilled in the art. All modifications which retain the basic underlying principles disclosed and claimed herein are within the scope of this invention.

We claim:

1. A method of processing digitally encoded LPC speech signals and producing analog speech from the LPC speech signals in a paging receiver included in a paging system having at least one base station terminal, said method comprising the steps of:
    (a) receiving paging information, the information including signalling signals and digitally encoded LPC speech signals encoded at the base station terminal;
    (b) detecting the signalling signals indicating that specific encoded LPC speech signals are to be stored by a particular paging receiver;
    (c) storing said encoded LPC speech signals in a memory means capable of storing a plurality of digitally encoded LPC speech messages;
    (d) producing an analog speech signal by processing said stored encoded LPC speech signals which a speech synthesizer wherein the method of producing an analog speech signal can be accomplished while simultaneously storing a different LPC speech signal; and
    (e) outputting the analog speech signal to generate audible information being a replica of the speech signals encoded at the base station terminal.

2. The method of claim 1 wherein said step (c) of storing further includes the step of storing new digitally encoded LPC encoded speech signals in unused memory locations.

3. The method of claim 1 wherein said step (c) of storing further includes the step of storing new digitally encoded LPC speech signals over the oldest stored digitally encoded LPC speech signals if unused memory locations are not available.

4. The method of claim 1 wherein said step (c) of storing further includes the step of storing new digitally encoded LPC speech signal over stored digitally encoded LPC speech signals which have been read if unused memory locations are not available.

5. The method of claim 1 wherein said step (c) of storing further includes simultaneously storing the address of the location of the stored LPC speech signals in a predetermined memory location.

6. A paging receiver for receiving and storing speech messages in a paging system having at least one base station transmitter, said receiver comprising:
    receiver means for receiving and detecting transmitted paging signalling information comprising pager address information and variable length digitally encoded LPC speech signals including an end-of-message signal, the LPC speech signal representative of LPC encoding of a speech message at the base station transmitter;
    address code memory means for storing predetermined address information;
    decoder and controller means, coupled to said address code memory means and responsive to said pager address information, for generating a first control signal when the pager address information matches the predetermined pager address, said decoder and controller means further generating a second control signal when the end-of-message signal is decoded;
    memory means for storing a plurality of digitally encoded LPC speech messages, including first and second memory ports, said first memory port coupled to said receiver means for receiving the digitally encoded LPC speech signals to be stored in said memory means together with beginning storage location information in response to the first control signal, said memory means further storing ending storage location information in response to the second control signal;
    speech synthesizer means, coujpled to said second memory port, for generating analog speech signals corresponding to the digitally encoded speech signal stored in said memory means;
    means for simultaneously storing received digitally encoded LPC speech signals while producing analog speech signals from digitally encoded LPC speech signals previously stored in memory.

7. The paging receiver as recited in claim 6 further comprising audio means coupled to the output of said speech synthesizer means for producing audible speech messages from the stored digitally encoded LPC speech signals.

8. The paging receiver as recited in claim 7 wherein said audio means is further responsive to said decoder and controller means for generating a sensible alerting signal indicating a speech message has been received.

9. The paging receiver as recited in claim 8 wherein the sensible alerting signal is audible.

10. The paging receiver as recited in claim 6 wherein said microprocessor stores a control word in said memory means representative of the status of the digitally encoded LPC speech message.

11. The paging receiver as recited in claim 10 wherein the control word stored in said memory means indicates whether a speech message has been read.

12. The paging receiver as recited in claim 10 wherein the control word indicates the order in which a message is received.

13. The paging receiver as recited in claim 6 wherein said speech synthesizer means includes a microcomputer, said microcomputer reading the beginning storage location information stored in said memory means for retrieving the digitally encoded LPC speech signals stored in said memory means for processing by said speech synthesizer means.

14. The paging receiver as recited in claim 6 wherein said memory means further includes an area for storing the beginning storage location information and ending storage location information.

15. A paging receiver for receiving and storing speech messages in a paging system having at least one base station transmitter, said receiver comprising:

receiver means for receiving and detecting transmitted paging signalling information comprising pager address information and variable length digitally encoded CVSD speech signals including an end-of-message signal, the CVSD speech signal representative of CVSD encoding of a speech message at the base station transmitter;

address code memory means for storing predetermined address information;

decoder and controller means, coupled to said address code memory means and responsive to said pager address information, for generating a first control signal when the pager address information matches the predetermined pager address, said decoder and controller means further generating a second control signal when the end-of-message signal is decoded;

memory means for storing a plurality of digitally encoded CVSD speech messages, including first and second memory ports, said first memory port coupled to said receiver means for receiving the digitally encoded CVSD speech signals to be stored in said memory means together with beginning storage location information in response to the first control signal, said memory means further storing ending storage location information in response to the second control signal;

speech synthesizer means, coupled to said second memory port, for generating analog speech signals corresponding to the digitally encoded speech signal stored in said memory means; and means for simultaneously storing received digitally encoded CVSD speech signals while producing analog speech signals from digitally encoded CVSD speech signals previously stored in memory.

16. The paging receiver as recited in claim 15 wherein said microprocessor stores a control word in said memory means representative of the status of the digitally encoded CVSD speech message.

17. The paging receiver as recited in claim 16 wherein the control word indicates the order in which a message is received.

18. The paging receiver as recited in claim 16 wherein the control word stored in said memory means indicates whether a speech message has been read.

19. The paging receiver as recited in claim 15 further comprising audio means coupled to an output of said speech synthesizer means for producing audible speech messages from the stored digitally encoded CVSD speech signals.

20. The paging receiver as recited in claim 15 wherein said speech synthesizer means includes a microcomputer, said microcomputer reading the beginning storage location information stored in said memory means for retrieving the digitally encoded CVSD speech signals stored in said memory means for processing by said speech synthesizer means.

* * * * *